Figure 1:
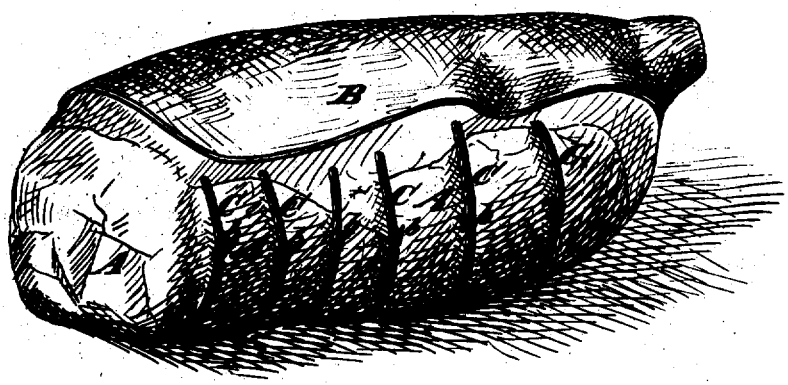

A. WARNER.

Preparation of Boned Pork-Hams and Shoulders.

No. 8,544. Reissued Jan. 21, 1879.

Witnesses
John Becker
Fred Haynes

Inventor
Morgan Lewis Warner
by his Attorneys
Brown & Brown

N. PETERS, PHOTO-LITHOGRAPHER, WASHINGTON, D. C.

UNITED STATES PATENT OFFICE

ALEXANDER WARNER, OF NEW YORK, N. Y.

IMPROVEMENT IN THE PREPARATION OF BONED PORK HAMS AND SHOULDERS.

Specification forming part of Letters Patent No. 209,948, dated November 12, 1878; Reissue No. 8,544, dated January 21, 1879; application filed December 7, 1878.

*To all whom it may concern:*

Be it known that I, ALEXANDER WARNER, of the city, county, and State of New York, have invented a new and useful Improvement in the preparation of Boned Pork Hams and Shoulders, of which the following is a description, reference being had to the accompanying drawing, forming part of this specification.

By the term "boned" ham and "boned" shoulder I mean a ham or shoulder from which the whole or such portion of the bone has been removed as to require the application of support to hold the meat together.

Heretofore it has been customary, in order to secure the meat of a boned ham or a boned shoulder together, to pass a series of cords or binders around the ham or shoulder, over the skin or rind thereof, and fasten the ends of said cords or binders together, or else to use a single cord passed around the joints of meat named, over the rinds thereof, in several places or various directions, and fastened by knotting or tying said cord at different points throughout its length. Now, when the skin or rind is removed from a boned ham or shoulder that has been prepared in the manner described, the securing cord or ties must either be removed with the skin or rind, thus leaving the meat without support, or, if the ties are left on, they become very much loosened by the stripping of the rind from beneath them; hence the said securing means serve but very imperfectly to sustain the cut parts which they are intended to hold together, and in either case the meat is liable to become irregularly separated and broken when sliced or carved.

The defects above recited are entirely obviated by my invention, which has for its object the production, as a new article of merchandise, of a boned ham or boned shoulder having its portions that have been cut for the removal of the bone secured by one or more ties or binders placed under the rind thereof, which ties shall not only serve to hold the meat of said joint together while the rind is on, but shall also serve to securely bind the meat of said joint after the rind has been removed therefrom.

By this disposition of the ties the skin or rind may be removed either before or after cooking without disturbing them, and it is not necessary that they be exposed by the removal of the skin, inasmuch as the ties may be placed so far below it that they will remain concealed after it has been taken off. To this end I tie up a boned ham or shoulder by placing cords or binders (preferably two or more separate ones) around the said joints of meat, under the rind thereof, and, having drawn the meat closely together, fasten the ends of the ties. This disposition of the tie or binders may be effected by means of a suitable needle having the tie or binder attached to it, and passing said needle through the joint of meat, under the rind thereof, and then fastening the ends of the tie together. Five or six or a greater or less number of ties may be used if desired, or a continuous tie passed several times around the ham or shoulder under the rind may be employed; but separate ties or binders are preferred.

Figure 2:
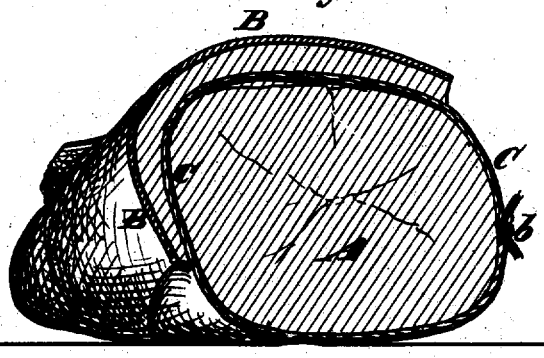

Figure 1 of the accompanying drawing represents a view, in perspective, of a boned ham before the skin or rind is removed, and showing a series of separate cords or binders as applied to said ham in accordance with my invention. Fig. 2 is a transverse section of the same.

In said drawing, A is the meat portion of the ham after so much of the bone has been removed therefrom by cutting as is desirable; B, the skin or rind of said joint, and C C a series of separate cords or binders, of any suitable material, passed around the ham, under its skin or rind, and through the meat next to the rind, and separately fastened together at their meeting ends *b*.

When a boned ham or shoulder which has been tied up in this manner is baked or boiled the skin or rind can be removed without disturbing the tie or binders, and they, remaining in position, will still support the cut portions of said ham or shoulder, so that it can be carved throughout without breaking the meat.

I claim—

1. An improved method of preparing boned hams and shoulders, the same consisting of binding together the meat of such hams or shoulders by placing one or more bands or ties around them and under the rind thereof, and then fastening the ends of the said bands or ties, substantially as and for the purposes specified.

2. A boned ham or shoulder having the portions of its meat which have been cut for the removal of the bone secured together by one or more ties or binders, which pass around the ham or shoulder and beneath the skin or rind thereof, and which have their ends fastened, substantially as and for the purpose herein described.

ALEXANDER WARNER.

Witnesses:

OWEN PRENTISS,

T. J. KEANE.